(12) United States Patent
Remus

(10) Patent No.: US 9,879,817 B2
(45) Date of Patent: Jan. 30, 2018

(54) EXTENDABLE TOWER MOUNT SYSTEM AND METHOD OF USE

(71) Applicant: Jared G. Remus, Downs, KS (US)

(72) Inventor: Jared G. Remus, Downs, KS (US)

(*) Notice: Subject to any disclaimer, the term of this patent is extended or adjusted under 35 U.S.C. 154(b) by 259 days.

(21) Appl. No.: 14/816,810

(22) Filed: Aug. 3, 2015

(65) Prior Publication Data

US 2016/0033118 A1    Feb. 4, 2016

Related U.S. Application Data

(60) Provisional application No. 62/032,361, filed on Aug. 1, 2014.

(51) Int. Cl.

| | |
|---|---|
| *B66F 3/00* | (2006.01) |
| *F16M 11/28* | (2006.01) |
| *F21V 21/22* | (2006.01) |
| *F16M 11/18* | (2006.01) |
| *F21W 111/00* | (2006.01) |

(52) U.S. Cl.
CPC ............ *F16M 11/28* (2013.01); *F16M 11/18* (2013.01); *F21V 21/22* (2013.01); *F21W 2111/00* (2013.01)

(58) Field of Classification Search
CPC ...... B66F 3/00; B66F 3/02; B66F 7/00; B66F 7/14
See application file for complete search history.

(56) References Cited

U.S. PATENT DOCUMENTS

| | | | | |
|---|---|---|---|---|
| 3,861,647 A | * | 1/1975 | Meredith | B66F 3/00 254/387 |
| 5,286,003 A | * | 2/1994 | Chuang | B66F 3/18 254/103 |
| 7,398,959 B2 | * | 7/2008 | Vandenberg | B60S 9/08 254/2 R |
| 8,191,864 B2 | * | 6/2012 | Ruan | B60P 7/15 254/100 |
| 8,840,087 B2 | * | 9/2014 | Guyard | B66F 3/00 254/345 |
| 2016/0033118 A1 | * | 2/2016 | Remus | F16M 11/28 362/418 |

* cited by examiner

*Primary Examiner* — Lee D Wilson
(74) *Attorney, Agent, or Firm* — Law Office of Mark Brown, LLC; Christopher M. DeBacker

(57) ABSTRACT

An adjustable, extendable beacon mount for a wireless communication or transmission tower. The mount mounts a beacon and allows the beacon to be raised and lowered as needed. The mount includes a lower weldment assembly with a base element and an upper weldment assembly to which a beacon is mounted. The upper weldment assembly is raised and lowered by a hand-cranked lever which activates a gear and, in turn, a ratchet pawl engages receiver notches on the upper weldment assembly, raising and lowering the upper weldment assembly. Alternatively, the hand crank could be replaced with an electric motor or other alternatively powered element to raise and lower the upper weldment assembly. The purpose is to raise the beacon above the communications or transmission antennas surrounding the top of a tower to provide a 360 degree unobstructed view for passing aircraft.

14 Claims, 8 Drawing Sheets

EXTENDABLE TOWER MOUNT SYSTEM AND METHOD OF USE

CROSS-REFERENCE TO RELATED APPLICATION

This application claims priority in U.S. Provisional Patent Application No. 62/032,361 filed Aug. 1, 2014, which is incorporated herein by reference.

BACKGROUND OF THE INVENTION

1. Field of the Invention

The present invention relates generally to an adjustable tower mount, and more specifically to system for raising and lowering a beacon atop a communications or transmission tower with an adjustable tower system for mounting a beacon.

2. Description of the Related Art

Each new or altered antenna tower structure registered with the FCC must conform to the FAA's painting and lighting recommendations set forth on the structure's FAA determination of "no hazard," and must be cleared with the FAA and filed with the FCC. These requirements include height requirements for beacons at the top of a tower. Presently, there is no simple means of adjusting the height of a beacon without additional construction, and there is no means of servicing a beacon without requiring service workers to climb to the extreme heights where the beacons are generally located to satisfy FAA regulations.

Heretofore there has not been available a system or method for an extendable beacon mounting system with the advantages and features of the present invention.

SUMMARY OF THE INVENTION

The present invention generally provides an adjustable, extendable beacon mount for a communication or transmission tower. The mount mounts a beacon and allows the beacon to be raised and lowered as needed. The mount includes a lower weldment assembly with a base element and an upper weldment assembly to which a beacon is mounted. The upper weldment assembly is raised and lowered by a hand-cranked lever which activates a gear and, in turn, a ratchet pawl engages receiver notches on the upper weldment assembly, raising and lowering the upper weldment assembly. Alternatively, the hand crank could be replaced with an electric motor or other alternatively powered element to raise and lower the upper weldment assembly.

BRIEF DESCRIPTION OF THE DRAWINGS

The drawings constitute a part of this specification and include exemplary embodiments of the present invention illustrating various objects and features thereof. The drawings and figures accompanying this specification show embodiments and features of the preferred embodiment of the present invention.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Adjustable Beacon Tower System 2

Figure 1:
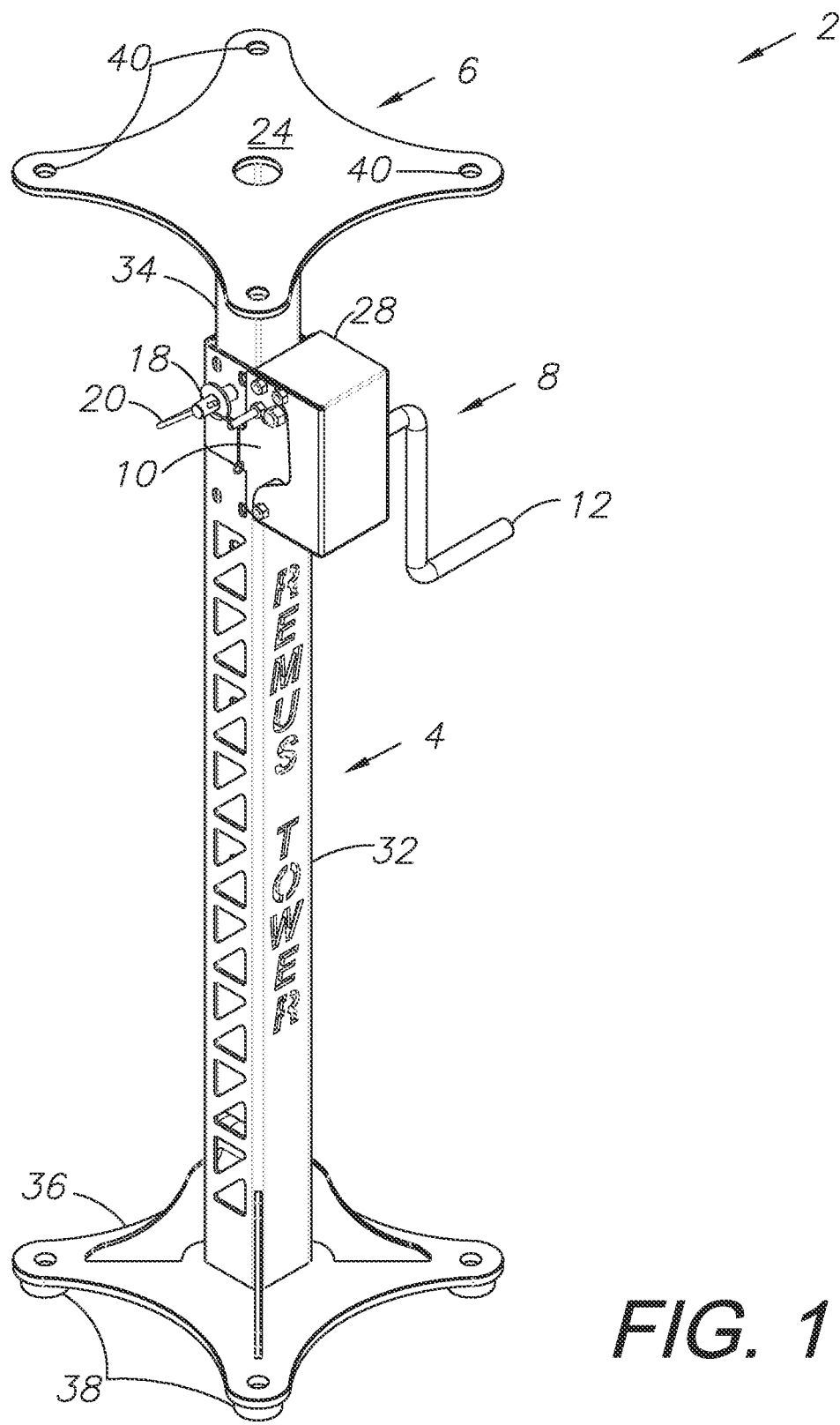
FIG. 1 is a three dimensional isometric view of a preferred embodiment of the present invention in a first, lowered position.

Referring to the figures in more detail, FIG. 1 shows a preferred embodiment beacon tower system 2. The preferred embodiment extendable beacon mount system 2 includes the ability to extend from a base position approximately 36 inches above the building structure to a maximum height of at least 66 inches. However, it should be noted that the mount could raise or lower from and to any reasonable height as required by the end user. The mount is meant to function as an extension to an existing communications tower structure and allows the beacon to be raised and lowered using a hand crank assembly 8 as shown in the figures. The purpose is to raise the beacon 3 above the communications or transmission antennas surrounding the top of a tower to provide a 360 degree unobstructed view for passing aircraft. The hand crank assembly 8 allows a single person to raise and lower the beacon by themselves. There is no need for additional construction or tools to raise and lower the beacon. The beacon can be raised so that the light from the beacon can be visible to passing aircraft. If the light must be serviced, the light can be lowered to bring the beacon to a safe working height.

The adjustable beacon tower system 2 primarily is made up of the lower weldment assembly 4 and the upper weldment assembly 6. Teeth on the gear 14 of the crank assembly 8 intersect with receivers 22 located on one face of the upper weldment assembly 6. When the crank handle 12 is turned, the gear 14 causes the upper weldment assembly to raise. Every six inches or so a locking point 26 along the upper weldment 6 will line up with a corresponding locking point on the lower weldment 4, and a pin 18 can be placed through the locking points to lock the upper weldment in place. The pin 18 is further secured by a spring clip 20 which may be connected to a cable to prevent it from being dropped.

Figure 2:
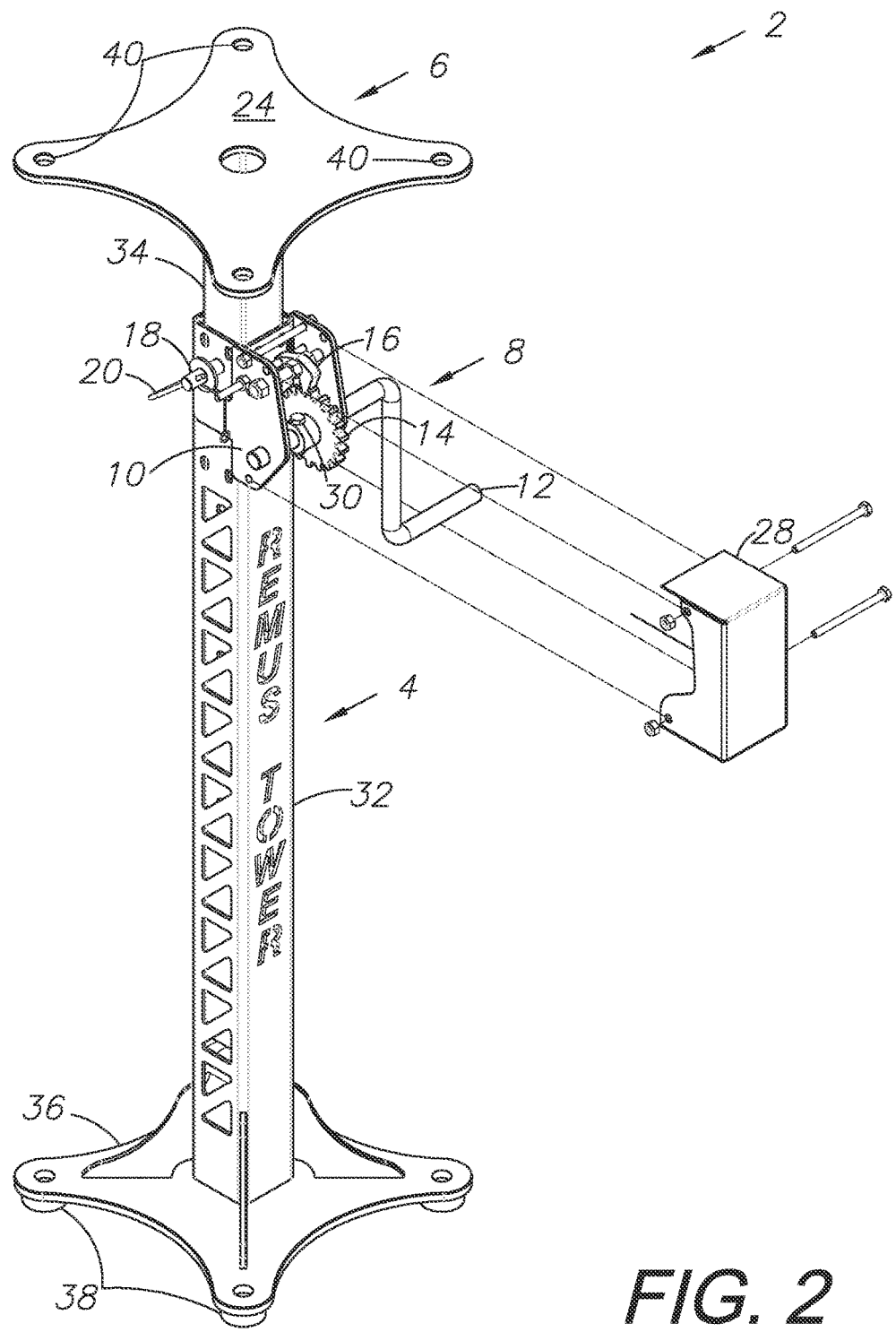
FIG. 2 is a slightly exploded isometric view thereof.

The crank assembly 8 is attached to the lower weldment 4 via a pair of mounting brackets 10. A ratchet pawl 16 interacts with the gear 14 to translate into a smooth raising or lowering of the upper weldment 6. FIG. 2 shows the cover 28 of the gearbox assembly 8 removed, exposing the gear 14, the ratchet pawl 16, and the various pins, bolts, and nuts which hold the assembly together. The handle 12 extends through the mounting brackets 10 and the gear 14, and is pinned to the gear via a handle pin 30.

Figure 3:
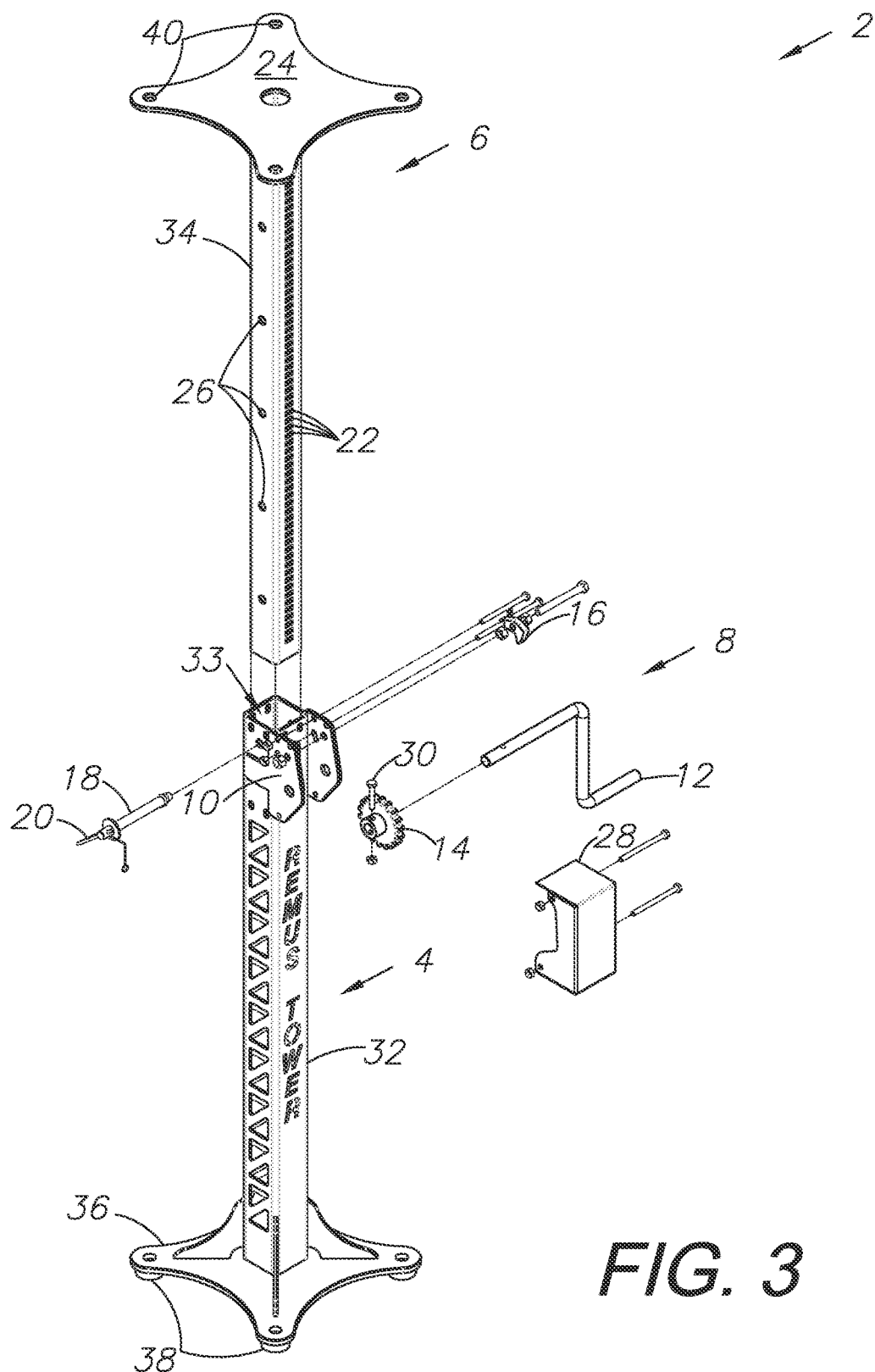
FIG. 3 is an exploded isometric view thereof.

FIG. 3 shows an exploded view where the upper weldment assembly 6 is removed from the lower weldment assembly 4. The upper weldment assembly 6 primarily includes the upper stem 34 which is typically inserted into an opening 33 at the top of the lower weldment stem 32. A plurality of locking points 26 are shown along two faces of the upper weldment stem 34, which receive the pin 18 which passes through the lower weldment stem 32 and through one of these locking points 26. The ratchet pawl 16 is received in one of a plurality of receivers 22 located on one face of the upper weldment stem 34. As the gear 14 is turned by the handle 12, the ratchet pawl 16 moves up or down amongst these receivers 22, thereby raising or lowering the upper weldment assembly 6 within the lower weldment assembly 4.

The lower weldment assembly also includes a base 36 with feet 38. There may be openings through the base and the feet to accept bolts for permanently mounting the beacon tower system 2 to a permanent structure, such as the top of a building or an antenna structure.

Figure 4:
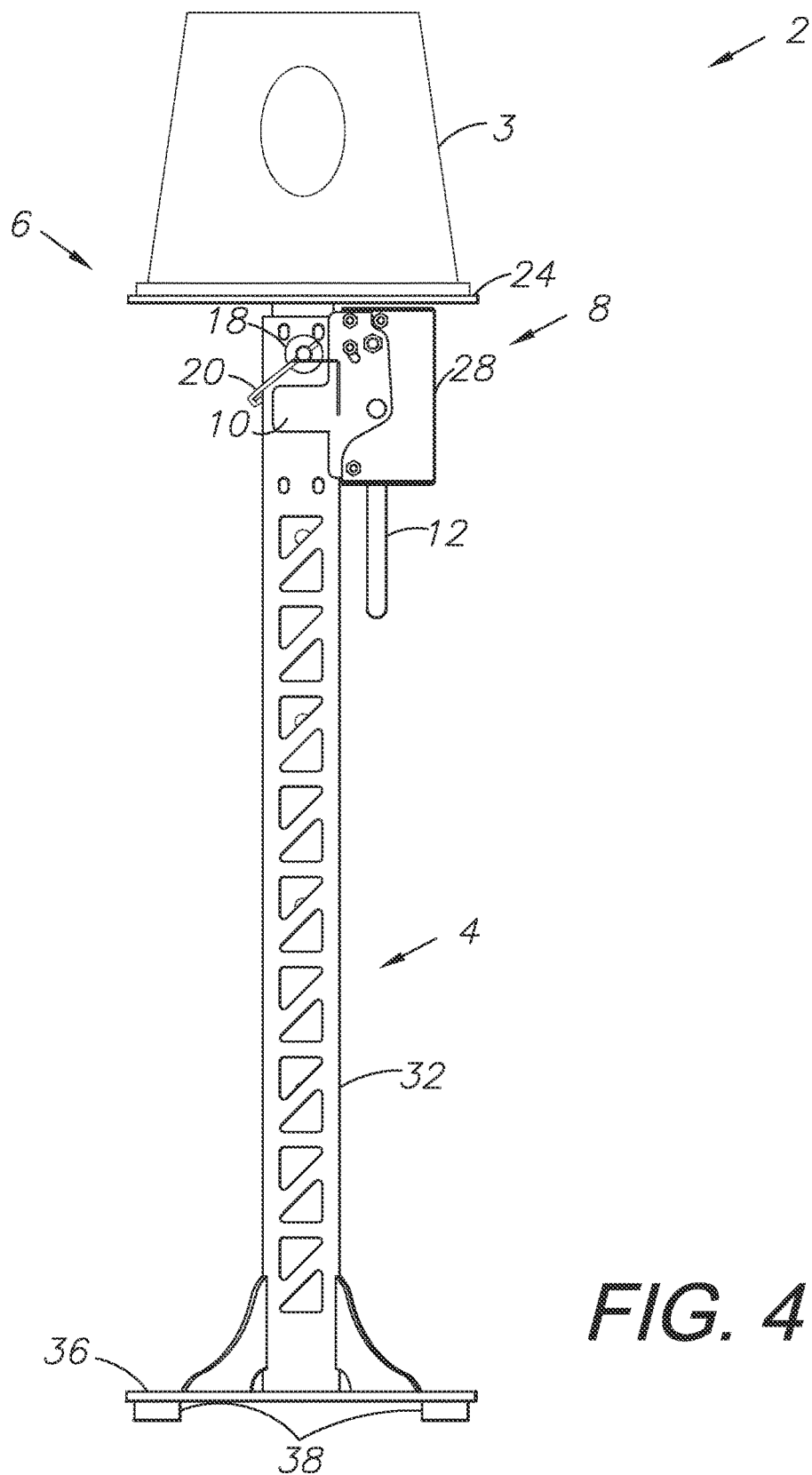
FIG. 4 is a side elevational view of a preferred embodiment of the present invention in a first, lowered position including a beacon.

The upper weldment assembly 6 includes the beacon mounting plate 24 for receiving a beacon 3 as shown in FIG. 4. The beacon is mounted to the mounting plate through four bolt holes 40.

Figure 5:
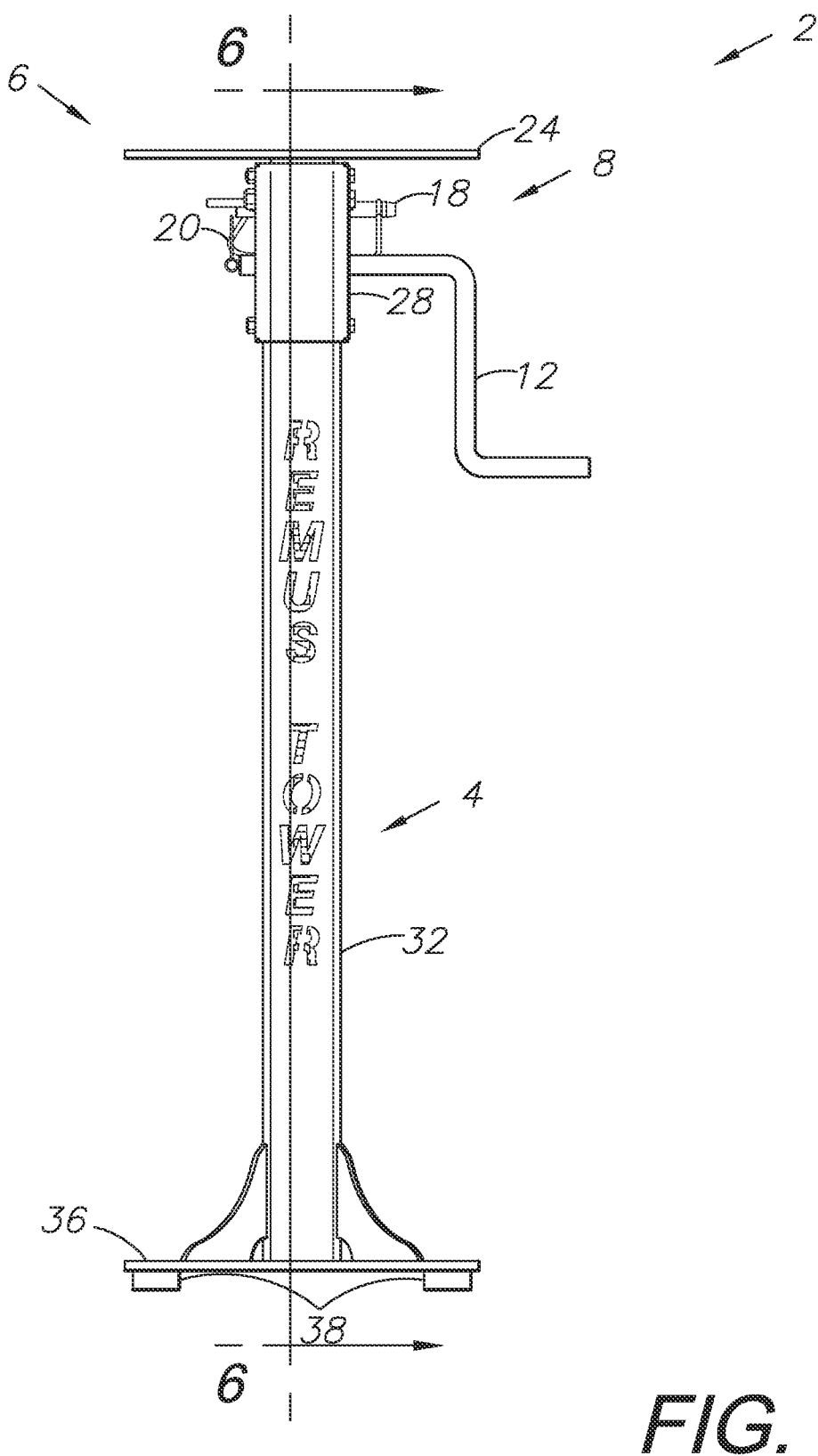
FIG. 5 is a front elevational view thereof, not including the beacon.
Figure 6:
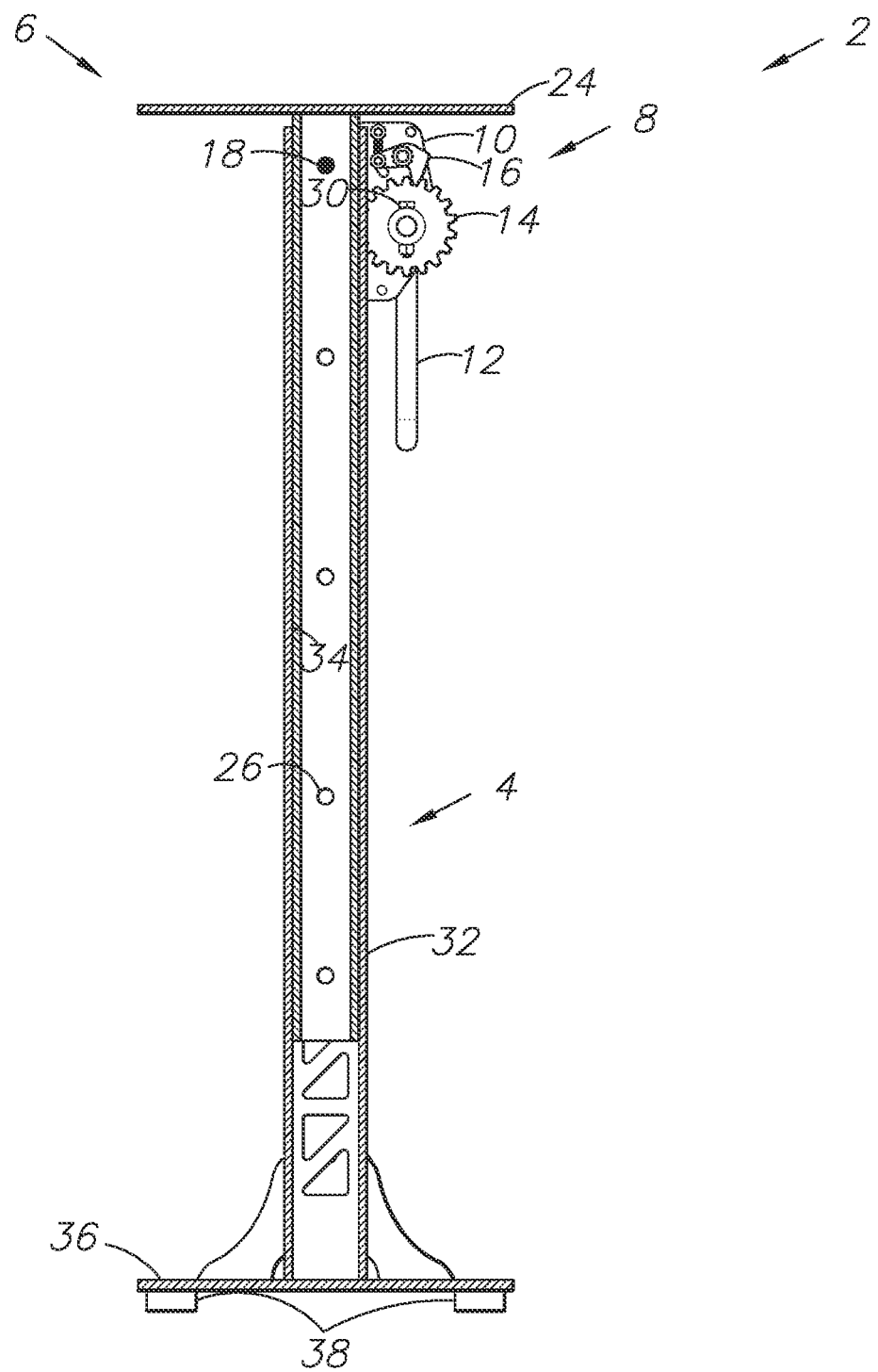
FIG. 6 is a sectional view taken about the line of FIG. 5.
Figure 7:
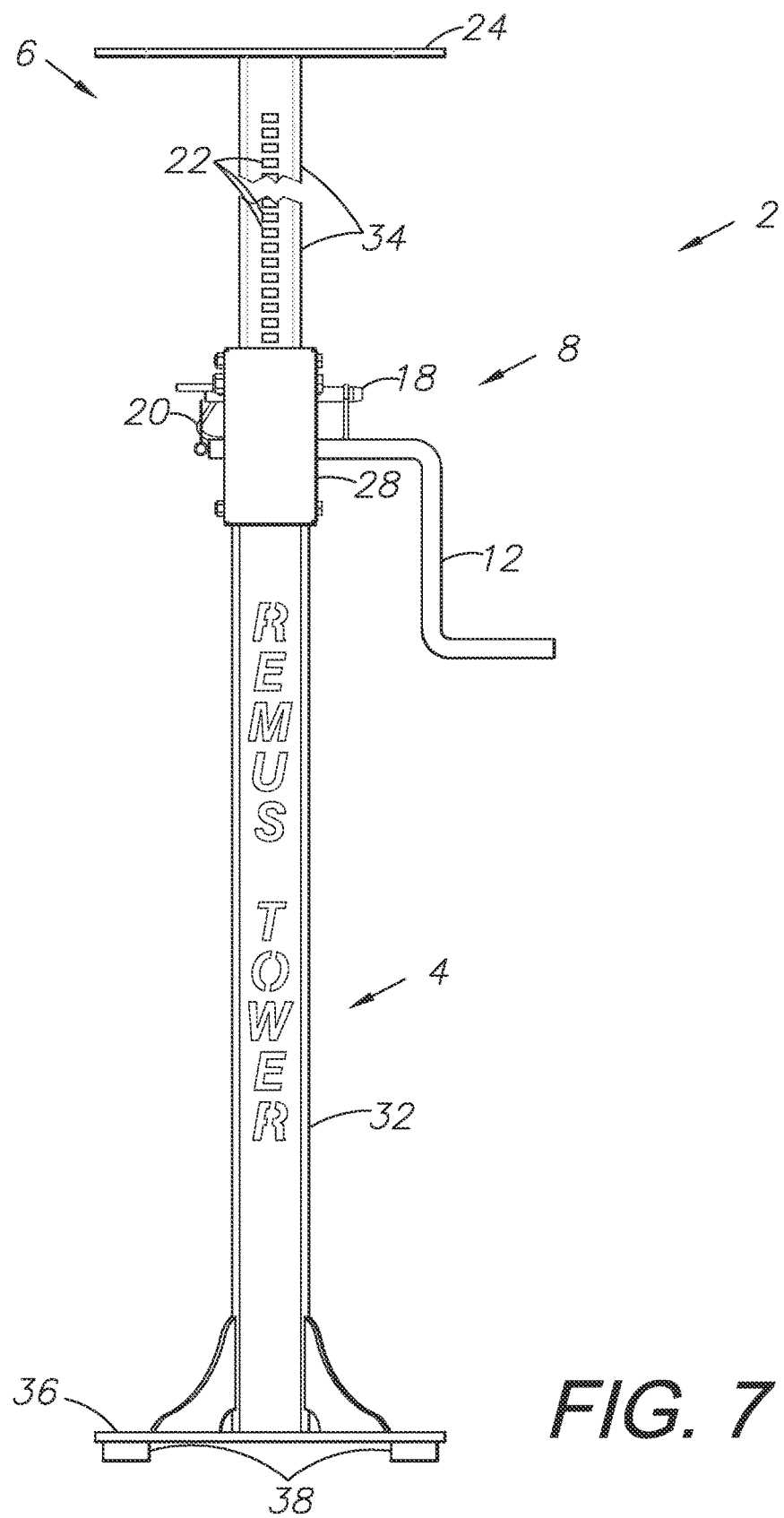
FIG. 7 is a front elevational view of a preferred embodiment of the present invention in a second, raised position.
Figure 8:
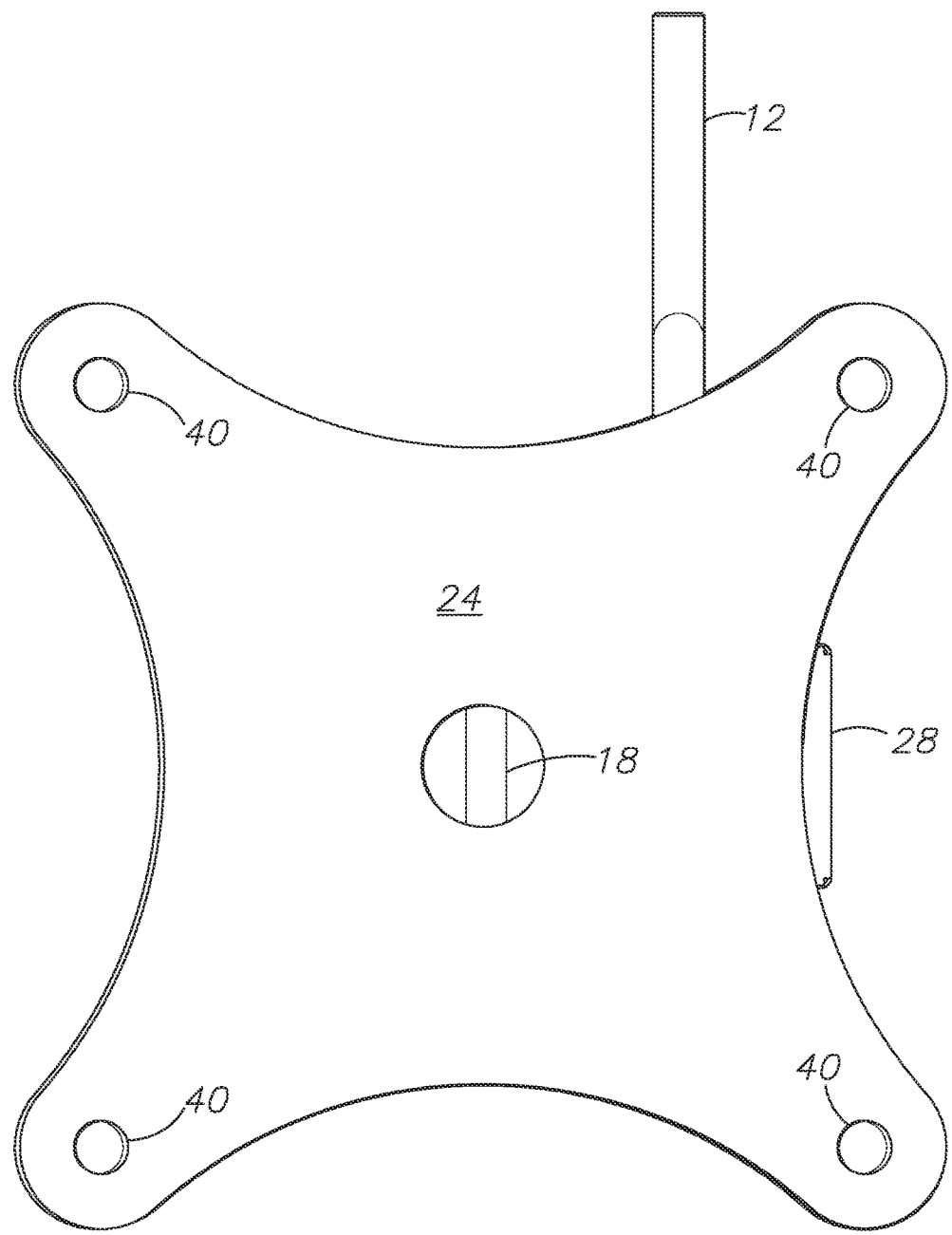
FIG. 8 is a top plan view of a preferred embodiment of the present invention.

FIGS. 4-8 show various other views of the preferred embodiment of the present invention, including a sectional view in FIG. 6 taken about the line of FIG. 5.

It should be noted that the hand crank 12 which activates the gear 14 and the ratchet pawl 16 could be replaced with an electric motor, a hydraulic controller, or other powered element which is controlled remotely or in proximity to the beacon tower system 2 by a controller.

It is to be understood that while certain embodiments and/or aspects of the invention have been shown and described, the invention is not limited thereto and encompasses various other embodiments and aspects.

Having thus described the disclosed subject matter, what is claimed as new and desired to be secured by Letters Patent is:

1. An adjustable beacon mounting system comprising:
an upper weldment assembly including an upper weldment stem having a proximal end and a distal end, and a beacon mounting plate affixed to said upper weldment stem proximal end;
a lower weldment assembly including a lower weldment stem having a proximal end and a distal end, and a base plate affixed to said lower weldment stem distal end;
said upper weldment assembly inserted into said lower weldment assembly through an opening located at said lower weldment stem proximal end;
a plurality of locking slots located on said upper weldment stem;
a single locking slot located in proximity to said distal end of said lower weldment stem;
a pin inserted through said single locking slot of said lower weldment stem and through one of said plurality of locking slots of said upper weldment stem, said pin configured to lock said upper weldment stem within said lower weldment stem;
a gearbox assembly connected to said lower weldment assembly and to said upper weldment assembly, said gearbox assembly configured to raise and lower said upper weldment assembly with respect to said lower weldment assembly; and
said gearbox assembly comprising a toothed gear and a ratchet pawl, said ratchet pawl configured to interface with a plurality of receiver slots located on said upper weldment stem.

2. The system of claim 1, further comprising:
a first, lowered position;
a second, raised position;
said gearbox assembly configured to raise and lower said upper weldment assembly between said first, lowered position and said second, raised position; and
said second, raised position providing an unobstructed 360 degree view of said beacon from passing aircraft.

3. The system of claim 2, further comprising:
said first, lowered position placing said beacon at a height of at least thirty-six (36) inches above a structure; and
said second, raised position placing said beacon at a height of at least sixty-six (66) inches above said structure.

4. The system of claim 1, further comprising:
a spring clip configured to be connected to said pin;
a cable connecting said spring clip to said lower weldment assembly; and
said spring clip and cable configured to prevent said pin from being dropped.

5. The system of claim 1, further comprising:
a mounting bracket affixed to said lower weldment assembly in proximity to said lower weldment stem distal end; and
said gearbox assembly mounted to said mounting bracket.

6. The system of claim 5, further comprising:
a hand crank including a pin portion and a handle, said hand crank pin portion inserted through said mounting bracket and said gear; and
said hand crank configured to rotate said gear, thereby facilitating the raising and lowering of said upper weldment assembly within said lower weldment assembly.

7. The system of claim 1, further comprising:
a motor mechanically connected to said gear; and
said motor configured to rotate said gear, thereby facilitating the raising and lowering of said upper weldment assembly within said lower weldment assembly.

8. An adjustable beacon mounting system comprising:
an upper weldment assembly including an upper weldment stem having a proximal end and a distal end, and a beacon mounting plate affixed to said upper weldment stem proximal end;
a lower weldment assembly including a lower weldment stem having a proximal end and a distal end, and a base plate affixed to said lower weldment stem distal end;
said upper weldment assembly inserted into said lower weldment assembly through an opening located at said lower weldment stem proximal end;
a plurality of locking slots located on said upper weldment stem;
a single locking slot located in proximity to said distal end of said lower weldment stem;
a pin inserted through said single locking slot of said lower weldment stem and through one of said plurality of locking slots of said upper weldment stem, said pin configured to lock said upper weldment stem within said lower weldment stem;

a gear assembly connected to said lower weldment assembly and to said upper weldment assembly, said gear assembly configured to raise and lower said upper weldment assembly with respect to said lower weldment assembly;

said gear assembly comprising a toothed gear and a ratchet pawl, said ratchet pawl configured to interface with a plurality of receiver slots located on said upper weldment stem;

a hand crank including a pin portion and a handle, said hand crank pin portion inserted through said mounting bracket and said gear; and said hand crank configured to rotated said gear, thereby facilitating the raising and lowering said upper weldment assembly within said lower weldment assembly.

9. A method of raising and lowering a beacon above a structure, the method comprising the steps:

mounting said beacon to a beacon mounting system, said beacon mounting system comprising an upper weldment assembly including a beacon mounting plate, a lower weldment assembly including a base plate affixed to said structure, and a gear assembly connecting said lower weldment assembly to said upper weldment assembly via a gear, a ratchet pawl, and a plurality of receiver slots located on said upper weldment assembly;

activating said gear of said gear assembly;

activating said ratchet pawl with teeth of said gear;

engaging said plurality of receiver slots with said ratchet pawl;

raising said upper weldment assembly within said lower weldment assembly;

inserting a pin through a locking slot of said lower weldment assembly and through a corresponding locking slot of said upper weldment assembly; and locking said upper weldment assembly at a fixed height with respect to said lower weldment assembly with said pin.

10. The method of claim 9, further comprising the steps:

raising said upper weldment assembly from a first, lowered position to second, raised position; and providing an unobstructed 360 degree view of said beacon from passing aircraft at said second, raised position.

11. The method of claim 10, wherein:

said first, lowered position placing said beacon at a height of at least thirty-six (36) inches above said structure; and said second, raised position placing said beacon at a height of at least sixty-six (66) inches above said structure.

12. The method of claim 9, further comprising the steps:

connecting a spring clip to said pin;

connecting a cable from spring clip to said lower weldment assembly; and preventing said pin from being dropped while connected to said spring clip.

13. The method of claim 9, further comprising the steps:

turning a handle to facilitate the activating of said gear, said handle including a hand crank pin portion connected to said gear.

14. The method of claim 9, further comprising the steps:

activating a motor to facilitate the activating of said gear, said motor mechanically connected to said gear.

* * * * *